United States Patent
Nazzaro

(10) Patent No.: US 11,076,617 B2
(45) Date of Patent: Aug. 3, 2021

(54) USE OF EMULSIFIERS IN ASSOCIATION WITH VEGETABLE OLEINS IN AN ANIMAL FEED

(75) Inventor: Serino Nazzaro, Milan (IT)

(73) Assignee: SEVECOM S.P.A., Milan (IT)

(*) Notice: Subject to any disclaimer, the term of this patent is extended or adjusted under 35 U.S.C. 154(b) by 0 days.

(21) Appl. No.: 14/125,084

(22) PCT Filed: Jun. 11, 2012

(86) PCT No.: PCT/IB2012/001128
§ 371 (c)(1),
(2), (4) Date: Dec. 9, 2013

(87) PCT Pub. No.: WO2012/168786
PCT Pub. Date: Dec. 13, 2012

(65) Prior Publication Data
US 2014/0127384 A1    May 8, 2014

(30) Foreign Application Priority Data
Jun. 10, 2011 (IT) .................. MI2011A001050

(51) Int. Cl.
| A23K 20/158 | (2016.01) |
|---|---|
| A23K 40/00 | (2016.01) |
| A23K 50/75 | (2016.01) |
| A23K 50/10 | (2016.01) |
| A23K 40/10 | (2016.01) |
| A23K 50/30 | (2016.01) |

(52) U.S. Cl.
CPC ............ *A23K 20/158* (2016.05); *A23K 40/00* (2016.05); *A23K 40/10* (2016.05); *A23K 50/10* (2016.05); *A23K 50/30* (2016.05); *A23K 50/75* (2016.05)

(58) Field of Classification Search
CPC .................................................. A23K 1/164
See application file for complete search history.

(56) References Cited

U.S. PATENT DOCUMENTS

| 4,680,315 | A | 7/1987 | Bezzegh et al. |
|---|---|---|---|
| 4,701,331 | A | 10/1987 | Grabitz |
| 4,749,577 | A | 6/1988 | Voege et al. |
| 5,457,128 | A | 10/1995 | Yanagawa |
| 6,083,520 | A | 7/2000 | Toneby |
| 6,379,723 | B1 | 4/2002 | Samuelsson |
| 6,482,463 | B1 | 11/2002 | Mologni et al. |
| 7,160,557 | B2 | 1/2007 | Bernstein et al. |
| 7,169,424 | B2 | 1/2007 | Antony et al. |
| 10,226,503 | B2 | 3/2019 | Ling |
| 2003/0044448 | A1 | 3/2003 | Myers et al. |
| 2004/0018217 | A1 | 1/2004 | Crepeau et al. |
| 2004/0076659 | A1 | 4/2004 | Shelford et al. |
| 2004/0202696 | A1 | 10/2004 | Yamin et al. |
| 2005/0022328 | A1 | 2/2005 | Weihrauch et al. |
| 2006/0008533 | A1 | 1/2006 | Habich et al. |
| 2006/0036419 | A1 | 2/2006 | Cook et al. |
| 2009/0186767 | A1 | 7/2009 | Arbogast et al. |
| 2009/0297686 | A1 | 12/2009 | Perez |
| 2010/0311846 | A1 | 12/2010 | Bendiner et al. |
| 2011/0009374 | A1 | 1/2011 | Keller |
| 2011/0070327 | A1 | 3/2011 | Wolf et al. |
| 2011/0104266 | A1 | 5/2011 | Guimberteau et al. |
| 2011/0200705 | A1 | 8/2011 | Tricarico et al. |
| 2012/0148718 | A1 | 6/2012 | Wilson et al. |
| 2014/0113057 | A1 | 4/2014 | Nazzaro |
| 2014/0127384 | A1 | 5/2014 | Serino |
| 2016/0037804 | A1 | 2/2016 | Nazzaro |
| 2017/0013862 | A1 | 1/2017 | Nazzaro |
| 2017/0215457 | A1 | 8/2017 | Serino |
| 2020/0000793 | A1 | 1/2020 | Falo, Jr. et al. |
| 2020/0063198 | A1 | 2/2020 | Blainey et al. |
| 2020/0359654 | A1 | 11/2020 | Serino |

FOREIGN PATENT DOCUMENTS

| BR | 9507457 A | 9/1997 |
|---|---|---|
| BR | 9509305 A | 12/1997 |
| BR | 9910340 A | 1/2001 |
| CL | 38112 | 8/2012 |
| CM | 1162909 A | 10/1997 |
| CN | 1089558 C | 10/1997 |
| CN | 1196410 C | 7/2001 |
| CN | 1302185 A | 7/2001 |

(Continued)

OTHER PUBLICATIONS

PCT International Search Report dated Oct. 11, 2012 for PCT/IB2012/001134 filed on Jun. 11, 2012.
PCT Written Opinion dated Oct. 11, 2012 for PCT/IB2012/001134 filed on Jun. 11, 2012.
PCT International Search Report dated Oct. 8, 2012 for PCT/IB2012/001128 filed on Jun. 11, 2012.
PCT Written Opinion dated Oct. 8, 2012 for PCT/IB2012/001128 filed on Jun. 11, 2012.
J. Flanagan et al., "Solubilisation of soybean oil in microemulsions using various surfactants", Food Hydrocolloids, 2006, vol. 20, No. 2-3, pp. 253-260, Abstract Only.
Eqbal M. A. Dauqan et al., "Fatty Acids Composition of Four Different Vegetable Oils (Red Palm Olein, Palm Olein, Corn Oil and Coconut Oil) by Gas Chromatography", 2011 $2^{nd}$ International Conference on Chemistry and Chemical Engineering IPCBEE, vol. 14, 2011.

(Continued)

*Primary Examiner* — Elizabeth Gwartney
(74) *Attorney, Agent, or Firm* — Steinfl + Bruno LLP

(57) ABSTRACT

A method of using emulsifiers in association with vegetable oleins in an animal feed. In particular, the present invention relates to a method of using emulsifiers E484 and/or E487 (Community Register of Feed Additives—EU Reg. No. 1831/2003) in association with vegetable oleins as a technological additive for increasing the hourly output (tons/hour) in a plant for preparing an animal feed and/or to improve the characteristics of an animal feed, preferably in the form of pellets, and/or to reduce the dustiness of the same. Furthermore, the present invention relates to an animal feed and a process for preparing the same wherein said emulsifiers are used in association with said vegetable oleins with the function of a technological additive.

22 Claims, No Drawings

(56) References Cited

FOREIGN PATENT DOCUMENTS

| | | | |
|---|---|---|---|
| CN | 101043819 A | 9/2007 |
| CN | 103619189 A | 3/2014 |
| DE | 102006033845 A1 | 1/2008 |
| EA | 201391677 A1 | 5/2014 |
| EP | 0197188 A1 | 10/1985 |
| EP | 0363733 A2 | 4/1990 |
| EP | 0 516 099 A1 | 12/1992 |
| EP | 0755195 A1 | 1/1997 |
| EP | 1151755 A1 | 11/2001 |
| EP | 1 800 546 A1 | 6/2007 |
| EP | 1800546 A1 | 6/2007 |
| EP | 1 925 211 A1 | 5/2008 |
| EP | 1925211 | 5/2008 |
| EP | 1717318 B1 | 7/2008 |
| EP | 2717714 B1 | 1/2019 |
| EP | 3485739 A1 | 5/2019 |
| EP | 3485739 B1 | 7/2020 |
| FR | 2863873 A1 | 6/2005 |
| GB | 1050497 A | 12/1966 |
| IT | MI2014A1326 A1 | 8/2015 |
| JP | 3768236 B2 | 4/2006 |
| JP | 5640079 B2 | 12/2014 |
| KR | 20060123119 A | 12/2006 |
| KR | 20070117582 A | 12/2007 |
| KR | 20110058881 A | 6/2011 |
| MX | 2016013058 A | 2/2017 |
| RU | 2254773 C2 | 6/2005 |
| WO | 95/28091 A1 | 10/1995 |
| WO | 96/11585 | 4/1996 |
| WO | 96/11585 A1 | 4/1996 |
| WO | 97/28896 A1 | 8/1997 |
| WO | 99/60865 A1 | 12/1999 |
| WO | 99/60865 A1 | 12/1999 |
| WO | 01/70044 A1 | 9/2001 |
| WO | 02/11550 A2 | 2/2002 |
| WO | 03/092403 A1 | 11/2003 |
| WO | 2005/034914 A1 | 4/2005 |
| WO | 2006/024620 A1 | 3/2006 |
| WO | 2006/094995 A1 | 9/2006 |
| WO | 2008/00710 A1 | 1/2008 |
| WO | 2010/029433 A1 | 3/2010 |
| WO | 2010/133609 A2 | 11/2010 |
| WO | 2012/080208 A1 | 6/2012 |
| WO | 2012/168786 A1 | 12/2012 |
| WO | 2012/168787 A1 | 12/2012 |
| WO | 2012/169869 A1 | 12/2012 |
| WO | 2013/003080 A1 | 1/2013 |
| WO | 2014/087224 A1 | 6/2014 |
| WO | 2015/155590 A1 | 10/2015 |
| WO | 2016/012881 A1 | 1/2016 |

OTHER PUBLICATIONS

Chinese First Office Action dated Dec. 31, 2014 for CN201280027254.1 which was filed in the name of SEVECOM S.P.A. (English translation attached).
Chinese First Office Action dated Jan. 21, 2015 for CN201280027314.X which was filed in the name of SEVECOM S.P.A. (English translation attached).
Chinese Search Report dated Jan. 13, 2015 for CN201280027314.X which was filed in the name of SEVECOM S.P.A. (English translation attached).
Italian Search Report dated Nov. 17, 2011 for MI20111051 which was filed on Jun. 10, 2011 (English translation attached).
Italian Search Report dated Dec. 18, 2012 for MI20120419 which was filed on Mar. 19, 2012 (English translation attached).
International Preliminary Report on Patentability dated Dec. 10, 2013 for PCT/IB2012/001134 filed in the name of SEVECOM S.P.A was filed on Jun. 11, 2012.
J. Flanagan et al., "Solubilisation of soybean oil in microemulsions using various surfactants", Food Hydrocollids, 2006, vol. 20, No. 2-3, pp. 253-260.
Chinese Second Office Action dated Sep. 21, 2015 for CN 201280027254.1 which was filed in the name of SEVECOM S.P.A. (English translation with Chinese original).
International Preliminary Report on Patentability for PCT/IB2013/002702 filed Dec. 6, 2013 on behalf of SEVECOM S.P.A. dated Jun. 18, 2015.
International Preliminary Report on Patentability for PCT/IB2012/001128 filed Jun. 11, 2012 on behalf of SEVECOM S.P.A. dated Dec. 10, 2013.
International Search Report and Written Opinion for International Application No. PCT/IB2015/000452 filed Apr. 8, 2015 on behalf of SEVECOM S.P.A. dated Jul. 9, 2015.
International Search Report and Written Opinion for International Application No. PCT/IB2013/002702 filed Dec. 6, 2013 on behalf of SEVECOM S.P.A. dated Mar. 12, 2014. 10 pages.
Non-Final Office Action for U.S. Appl. No. 14/125,085, filed Dec. 9, 2013 on behalf of Serino Nazzaro. dated Sep. 7, 2016. 19 pages.
Restriction Requirement for U.S. Appl. No. 14/649,523, filed Jun. 3, 2015 on behalf of Serino Nazzaro. dated Jul. 26, 2016. 11 pages.
Bontempo, V. et al. "The effects of a novel synthetic emulsifier product on growth performance o chickens for fattening and weaned piglets" Animal, The Animal Consortium 2015, Accepted Oct. 7, 2015; 6 pages.
European Patent Office Communication pursuant to Article 94(3) EPC for European Patent Application No. 12740655.1 filed on behalf of SEVECOM S.P.A. dated Dec. 9, 2016. 6 pages.
"Nourishing" Wiktionary, dated Mar. 16, 2010. 1 page. https://web.archive.org/web/20100316183700/http://en.wiktionary.org:80/wiki/nourishing.
"Nourishment" Wiktionary, dated Mar. 16, 2010. 1 page. https://web.archive.org/web/20100316103645/http://en.wiktionary.org:80/wiki/nourishment.
"Nutritive" Wiktionary, dated Jun. 19, 2010. 1 page. ttps://web.archive.org/web/20100619020304/https://en.wiktionary.org/wiki/nutritive.
Restriction Requirement for U.S. Appl. No. 14/125,085, filed Dec. 9, 2013 on behalf of Serino Nazzaro. dated Mar. 15, 2017. 9 pages.
Final Office Action for U.S. Appl. No. 14/125,085, filed Dec. 9, 2013 on behalf of Serino Nazzaro. dated Jun. 23, 2017. 13 pages.
Parr, W.H., The Small-Scale Manufacture of Compound Animal Feed (ODNRI Bulletin No. 9), pp. 20-38, (1988), 94 pages.
International Preliminary Report on Patentability for PCT/IB2015/000452 filed Apr. 8, 2015 on behalf of SEVECOM S.P.A. dated Oct. 20, 2016. 7 pages.
2nd Brazilian Office Action for BR112013030431-6 filed for Serino Nazzaro on Nov. 6, 2012, dated Dec. 7, 2018. 13 pages. English + Brazilian translation.
Advisory Action for U.S. Appl. No. 14/909,455, filed Feb. 1, 2016 on behalf of SEVECOM S.P.A. dated May 10, 2019 8 pages.
Brazilian Office Action for Brazilian Application No. BR112016023135-0 filed on Apr. 8, 2015 on behalf of SEVECOM S.P.A. dated Oct. 21, 2019 5 pages (Partial English + Original).
Certificate of Correction for U.S. Pat. No. 5,457,128. (dated Aug. 20, 1996).
Chilean Office Action for Chilean Application No. 201602530 filed on Oct. 5, 2016 on behalf of SEVECOM S.P.A. dated Oct. 10, 2018 12 pages (Partial English + Original).
European Extended Search Report for Application No. 19150219.4, dated Feb. 21, 2019, by European Patent Office, 7 pages.
European Patent Office Communication pursuant to Rule 71(3) EPC for European Patent Application No. 19150219.4 filed on Jun. 11, 2012 on behalf of SEVECOM S.P.A. dated Feb. 11, 2020. 31 pages.
Final Office Action for U.S. Appl. No. 14/909,455, filed Feb. 1, 2016 on behalf of SEVECOM S.P.A dated Mar. 13, 2020. 23 Pages.
Final Office Action for U.S. Appl. No. 14/125,084, filed Dec. 9, 2013 on behalf of SEVECOM S.P.A dated Jun. 14, 2018. 10 pages.
Final Office Action for U.S. Appl. No. 14/909,455, filed Feb. 1, 2016 on behalf of SEVECOM S.P.A. dated Jan. 3, 2019. 12 pages.
First Examination Report for Chilean Patent Application No. 00091-2017 filed on behalf of SEVECOM S.P.A. Date of Presentation: May 14, 2018. 14 pages. (Spanish Original + English Translation).

(56) References Cited

OTHER PUBLICATIONS

First Office Action for Eurasian Patent Application No. 201692571/28 filed on Jun. 25, 2015 on behalf of SEVECOM S.P.A. dated Sep. 13, 2019. (Russian & English Trans). 5 Pages.
First Office Action for Malaysian Application No. PI 2017700035 filed on Jun. 25, 2015 on behalf of SEVECOM S.P.A. dated Mar. 27, 2020. 2 Pages.
Indonesian Office Action for Indonesian Patent Application No. P00201701123 filed on behalf of SEVECOM S.P.A. dated Feb. 24, 2020. 3 Pages (Indonesian + English Trans).
International Preliminary Report on Patentability for International Application No. PCT/IB2015/054782 filed Jun. 25, 2015 on behalf of SEVECOM S.P.A. dated Jan. 24, 2017. 6 pages.
International Search Report and Written Opinion for International Application No. PCT/IB2015/054782 filed Jun. 25, 2015 on behalf of SEVECOM S.P.A. dated Nov. 17, 2015. 10 pages.
Juan Elias Castillo Hidalgo, "Rheological Characterization and Determination of Optimum Time of Mixing (T.O.M.) in Mixes of Powders for Veterinary Use", Austral University of Chile, Valdivia Chile,(2011), 77 pages. (English Translation + Spanish Original).
Non-Final Office Action for U.S. Appl. No. 14/909,455, filed Feb. 1, 2016 on behalf of SEVECOM S.P.A dated Aug. 29, 2019 15 pages.
Non-Final Office Action for U.S. Appl. No. 15/318,273, filed Jan. 23, 2017 on behalf of SEVECOM S.P.A dated Nov. 7, 2019 17 pages.
Non-Final Office Action for U.S. Appl. No. 14/909,455, filed Feb. 1, 2016 on behalf of SEVECOM S.P.A. dated Apr. 30, 2018. 10 pages.
Notice of Allowance for Korean Application No. 20147000619 filed on Jan. 9, 2014 in the name of SEVECOM S.P.A. dated Jan. 23, 2020. 4 Pages (Korean & English Trans).
Preliminary Brazilian Office Action for Brazilian Application No. BR112017000878-5 filed on Jun. 25, 2015 on behalf of SEVECOM S.P.A. dated Oct. 31, 2019. (Partial English + Original). 5 pages.
Propylene-Glycol—Wikipedia Article Date: Apr. 30, 2019 10 pageshttps://en.wikipedia.org/w/index.php?title=Propylene_glycol&oldid=894359720.
Restriction Requirement for U.S. Appl. No. 15/328,273, filed Jan. 23, 2017 on behalf of SEVECOM S.P.A., dated Apr. 8, 2019. 8 pages.
Scientific Control—Wikipedia Article Date: Mar. 27, 2014 5 pages https://en.wikipedia.org/wiki/Scientific_control.
"What is propylene glycol?", downloaded from https://www.atsdr.cdc.gov/csem, 8 pages, dated Dec. 2013 (Year: 2013).
Final Office Action for U.S. Appl. No. 15/328,273, dated Apr. 28, 2020. 13 pages.
Notice of Allowance, including Interview Summary, for U.S. Appl. No. 15/328,273, dated May 4, 2020. 10 pages.
Office Action and Search Report for Chinese Patent Application No. 201711120723.5 with English Translation, dated Jul. 2, 2020. 14 pages.
Korean Patent Office Notice of Allowance from for Korean Application No. 10-2020-7009778 in the name of SEVECOM S.P.A. dated Nov. 26, 2020. Original + Eng translation. 3 pages.
Corrected Notice of Allowability for U.S. Appl. No. 15/328,273, filed Jan. 23, 2017 on behalf of SEVECOM S.P.A. dated Sep. 14, 2020. 3 pages.
Indian Office Action for IN Application No. 201627044599 filed on Dec. 28, 2016 on behalf of SEVECOM S.P.A. dated Oct. 1, 2020. 5 Pages Hindi + English Translation.
Mexican Office Action for MX Application No. MX/a/2017/000849 filed on Jun. 25, 2015 on behalf of SEVECOM S.P.A. dated Sep. 7, 2020. 9 Pages. Spanish + English Translation.
Notice of Allowability for Ukrainian Patent Application No. 201700730 filed on Jun. 25, 2015, on behalf of SEVECOM S.p.A. dated Sep. 16, 2020. Ukrainian Original +English Translation. 6 Pages.
Notice of Allowability for U.S. Appl. No. 15/328,273, filed Jan. 23, 2017 on behalf of SEVECOM S.P.A. dated Oct. 23, 2020. 5 Pages.
Office Action for Chinese Patent Application No. 201580038274.2 filed on Jun. 25, 2015 on behalf of SEVECOM S.P.A. dated Sep. 29, 2020. CN Original + English Trans. 13 pages.
Office Action for Indonesian Patent Application No. P0020170112 filed on behalf of SEVECOM S.p.A. dated Oct. 22, 2020. Indonesian + English translation. 4 Pages.
Office Action for Vietnamese application 1-2014-00015 filed on Jun. 11, 2012 on behalf of SEVECOM S.P.A. dated Sep. 30, 2020. Original and Eng trans. 3 pages.
Physical Chemistry, Beijing Medical College, pp. 83, People's Medical Publishing House, Jul. 1979. 4 Pages. Chinese Original and Partial English.
Ping, Ning et al., "New Technology Practice Manual of Novel Process and Application of Feed Additive Development and processing," vol. 1, pp. 27, Minerals, Tsinghua Tongfang (CD) Electronic Publishing House, Mar. 2004. 3 Pages. Chinese Original and Partial English Trans.
Russian Office Action for RU Application No. 2019091905/28 filed on Oct. 30, 2019 on behalf of SEVECOM SPA, dated Aug. 31, 2020. 4 Pages. Russian original & Eng trans.
Form M. 0203ES, issued on Oct. 23, 2009, Institute of Ethical and Environmental Certification, pp. 1-2, 49 and 50. rosorganic.ru/files/stardart-icea.pdf. 5 pages, Original + Partial Eng. trans.
Invitation pursuant to Rule137(4) EPC and Article 94(3) EPC from the European Patent Office for EP Application 15753449.6 filed on Jun. 25, 2015 for SEVECOM S.P.A. dated Dec. 1, 2020. 2 pages.
Notification of the necessity to present additional materials for Eurasian Patent Application No. 201692571/28 filed on Jun. 25, 2015 on behalf of SEVECOM S.P.A. dated Oct. 21, 2020. (Russian & English Trans) 10 pages.
Office Action issued by the Intellectual Property Office of Vietnam for Vietnamese Application No. 1-2017-00080 filed on Jun. 25, 2015 for SEVECOM S.P.A. dated Oct. 30, 2020. 4 pages. Original + Eng. trans.
Technical Report No. VLT0043-2020 for Peruvian Case file No. 000025-2017/DIN filed on Jan. 6, 2017 (corresponding PCT/IB2015/054782) on behalf of SEVECOM S.P.A. Issued by INDECOPI dated Nov. 30, 2020. Spanish Original + Eng. trans. 11 pages.
Corrected Notice of Allowability for U.S. Appl. No. 15/328,273, filed Jan. 23, 2017 on behalf of SEVECOM S.P.A. dated Jan. 28, 2021. 4 Pages.
Notice of Allowance for U.S. Appl. No. 15/328,273, filed Jan. 23, 2017 on behalf of SEVECOM S.P.A. dated Jan. 14, 2021. 9 Pages.

USE OF EMULSIFIERS IN ASSOCIATION WITH VEGETABLE OLEINS IN AN ANIMAL FEED

CROSS REFERENCE TO RELATED APPLICATIONS

The present application is the US national stage of International Patent Application PCT/IB2012/001128 filed on Jun. 11, 2012, which, in turn, claims priority to Italian Patent Application MI2011A001050 filed on Jun. 10, 2011.

The present invention relates to the use of emulsifiers in association with vegetable oleins in an animal feed. In particular, the present invention relates to the use of emulsifiers E484 and/or E487 (Community Register of Feed Additives—EU Reg. No. 1831/2003), in association with vegetable oleins, as a technological additive to increase hourly output (tons/hour) in an animal feed production plant and/or improve the characteristics of an animal feed, preferably in the form of pellets, and/or to reduce the dustiness thereof.

Moreover, the present invention relates to an animal feed and a process for preparing the same in which said emulsifiers are used in association with said vegetable oleins with the function of technological additive.

In the sector of production of animal feeds, preferably in solid form, for example in the form of pellets, a need has long been felt to be able to produce large amounts per day at increasingly lower costs while maintaining high standards as regards the characteristics and chemical and/or physical properties of the feed itself.

In practice, animal feed manufacturers tend on the one hand to increase the output of their plants and on the other hand to contain production costs. Maximizing the output of their plants means that animal feed manufacturers do not have to design and build new plants, while saving on production costs means being increasingly competitive. Among the factors that most greatly impact the cost of producing an animal feed we may mention, for example, the cost of the electricity needed for the equipment and the downtimes that result every time the equipment is disabled due to the activation of the equipment safety systems, which are triggered every time there is an increase in temperature due to friction during the mixing, compression and/or pelleting steps, or an excessive demand of energy from the motors present in the plant. Practically speaking, depending on the type of feed being produced in a plant, for example a feed for chickens, turkeys, pigs, ruminants or fish, there is a considerable variation in the type of raw materials used and equipment parameters, so that "standardization of production cycles" is not always easy to achieve.

Furthermore, animal feed manufacturers have an interest in reducing the consumption of electricity and amount of dust allowed in workplaces.

Therefore, industry operators feel a need to be able to give an adequate response to the above-mentioned limits and disadvantages.

One of the objects of the present invention consists in being able to increase the hourly output (tons/hour) in plants that produce animal feeds in solid form, for example in the form of pellets, while maintaining high standards as regards the characteristics and chemical and/or physical properties of the feed itself, such as, for example, the pellet durability index (PDI).

Another object of the present invention consists in being able to contain production costs, which means reducing electricity consumption expressed as amperes/hour.

Yet another object of the present invention consists in being able to reduce the amount of dust produced in an animal feed in solid form, for example in the form of pellets.

The Applicant has surprisingly found that the above objects, and yet other objects which will be apparent from the detailed description that follows, are achieved thanks to the use, as a technological additive, of vegetable oleins (at least one vegetable olein) in association with an emulsifier included in the list of animal feed additives authorized under EU regulation No. 1831/2003.

The present invention relates to the use of an ethoxylated castor oil in association with vegetable oleins (at least one vegetable olein), as set forth in the appended claim.

The present invention further relates to the use of polyethylene glycol esters of fatty acids obtained from soybean oil in association with vegetable oleins (at least one vegetable olein), as set forth in the appended claim.

The present invention still further relates to the use of an ethoxylated castor oil, for example E484, and polyethylene glycol esters of fatty acids obtained from soybean oil, for example E487, in association with vegetable oleins (at least one vegetable olein), as set forth in the appended claim.

The present invention still further relates to an animal feed containing or, alternatively, consisting of an ethoxylated castor oil in association with vegetable oleins (at least one vegetable olein), as set forth in the appended claim.

The present invention still further relates to an animal feed containing or, alternatively, consisting of polyethylene glycol esters of fatty acids obtained from soybean oil in association with vegetable oleins (at least one vegetable olein), as set forth in the appended claim.

The present invention still further relates to an animal feed containing or, alternatively, consisting of an ethoxylated castor oil, for example E484, and polyethylene glycol esters of fatty acids obtained from soybean oil, for example E487, in association with vegetable oleins (at least one vegetable olein), as set forth in the appended claim.

The present invention further relates to a process for preparing said animal feed, as set forth in the appended claim.

The present invention still further relates to the use of a mixture containing or, alternatively, consisting of an ethoxylated castor oil, for example E484, and/or polyethylene glycol esters of fatty acids obtained from soybean oil, for example E487, in association with vegetable oleins (at least one vegetable olein), as a technological additive, as set forth in the appended claim.

Preferred embodiments of the present invention will be illustrated in the detailed description that follows.

Ethoxylated castor oil, also known by the name glyceryl polyethylene glycol ricinoleate or glycerol polyethylene glycol ricinoleate (additive E484—EU Reg. 1831/2003) is a surfactant compound or emulsifier included in the list of authorized animal feed additives.

Ethoxylated castor oil contains from 8 to 200 ethyleneoxy groups; preferably from 10 to 150 ethyleneoxy groups; even more preferably from 15 to 100 ethyleneoxy groups.

In a preferred embodiment, the ethoxylated castor oil contains from 20 to 80 ethyleneoxy groups.

In another preferred embodiment, ethoxylated castor oil contains from 25 to 60 ethyleneoxy groups.

In a preferred embodiment, ethoxylated castor oil contains 40 ethyleneoxy groups.

Advantageously, ethoxylated castor oil contains from 30 to 45 ethyleneoxy groups.

By ethoxylated castor oil containing, for example, 20 ethyleneoxy groups (an ethyleneoxy group derives from ethylene oxide), we mean a product obtained by reacting 1 mole of castor oil [by way of example, castor oil in general can contain ricinoleic acid in an amount by weight comprised from 85% to 95%, oleic acid in an amount by weight comprised from 2% to 6%, linoleic acid in an amount by weight comprised from 5 to 1%, linolenic acid in an amount by weight comprised from 1 to 0.5%, stearic acid in an amount comprised from 1 to 0.5%, palmitic acid in an amount comprised from 1 to 0.5%, dihydroxystearic acid in an amount comprised from 1 to 0.5% and other compounds in an amount comprised from 0.5% to 0.2%] con 20 moles of ethylene oxide using techniques, apparatus and operating conditions known to the person skilled in the art. In the context of the present invention and hereinafter we shall make reference in general to "ethoxylated castor oil" to indicate one or more of the above-mentioned embodiments, having a variable number of ethyleneoxy groups, without any limitation, but solely for the purpose of simplifying the present description.

Polyethylene glycol esters of fatty acids obtained from soybean oil, (additive E487—Reg. UE 1831/2003) are surfactant compounds or emulsifiers included in the list of authorized animal feed additives.

Said polyethylene glycol esters of fatty acids obtained from soybean oil, (additive E487—Reg. UE 1831/2003) are obtained using techniques and apparatus known to the person skilled in the art.

For example, said polyethylene glycol esters of fatty acids obtained from soybean oil (additive E487—EU Reg. 1831/2003) can be obtained from soybean oil, for example from soybean oil triglycerides, which are hydrolyzed, using techniques and apparatus known to the person skilled in the art, to yield saturated and/or unsaturated fatty acids of soybean oil. Subsequently, said fatty acids are ethoxylated with ethylene oxide using known techniques and apparatus. Ethylene oxide binds to the carboxyl of the fatty acid to yield the fatty acid obtained from ethoxylated soybean oil.

For example, said polyethylene glycol esters of fatty acids obtained from soybean oil, (additive E487—EU Reg. 1831/2003) can be obtained from the reaction between a polyethylene glycol—indicated as PEG for the sake of brevity [CAS number 25322-68-3; structural formula $HOCH_2$—$(CH_2$—$O$—$CH_2)_{(n-1)}$—$CH_2OH$ or $H$—$(OCH_2$—$CH_2)_n$—$OH$; molecular weight comprised, for example, from 100 to 10000] with the fatty acids obtained from soybean oil or with soybean oil fats or triglycerides using techniques, apparatus and operating conditions known to the person skilled in the art.

By fatty acids obtained from soybean oil we mean one or more fatty acids obtained (for example by hydrolysis) using techniques, apparatus and operating conditions known to the person skilled in the art.

Preferably, the polyethylene glycol (PEG) has a molecular weight comprised from 200 to 5000.

Preferably, the polyethylene glycol has a molecular weight comprised from 300 to 4000; even more preferably from 400 to 3500.

In a preferred embodiment, the polyethylene glycol has a molecular weight comprised from 500 to 1500.

In another preferred embodiment, the polyethylene glycol has a molecular weight comprised from 600 to 1000, for example from 700 to 900.

Soybean oil (100 g) generally has the following composition: approximately 16 g of saturated fats, approximately 23 g of monounsaturated fats, approximately 58 g of polyunsaturated fats and approximately 3% of other compounds.

A soybean oil, preferably a refined soybean oil, from which, in general, the following fatty acids are obtained:
  alpha-linolenic acid (C-18:3)—CAS number 463-40-1, approximately 5 to 10%;
  a linoleic acid (C-18:2)—CAS number 60-33-3, approximately 50 to 60%;
  oleic acid (C-18:1)—CAS number 112-80-1, approximately 18 to 25%;
  stearic acid—CAS number 57-11-4, approximately 3 to 6%;
  palmitic acid—CAS number 57-10-3, approximately 8 to 12%.

The polyethylene glycol esters of fatty acids obtained from the soybean oil of the present invention (additive E487—EU Reg. No. 1831/2003) can be in the form, for example, of monoesters or diesters or mixtures thereof.

For example, the PEG has been reacted with a fatty acid obtained from soybean oil in a molar ratio of 1:1, or with a mixture of fatty acids obtained from soybean oil in a molar ratio of 1:1, to yield monoesters.

For example, the PEG has been reacted with a fatty acid obtained from soybean oil in a molar ratio of 1:2, or with a mixture of fatty acids obtained from soybean oil in a molar ratio of 1:2, to yield diesters.

Alternatively, in the context of the present invention, the polyethylene glycol esters of fatty acids obtained from soybean oil can be obtained by subjecting the soybean oil fatty acids and/or soybean oil fats or triglycerides to an ethoxylation process with ethylene oxide using the techniques, apparatus and operating conditions known to the person skilled in the art.

In the context of the present invention and hereinafter we shall make reference in general to "polyethylene glycol esters of fatty acids obtained from soybean oil" to indicate one or more of the above-mentioned embodiments having a PEG with a variable molecular weight and a variable composition of soybean oil fatty acids, without any limitation, but solely for the purpose of simplifying the present description.

In a preferred embodiment, the polyethylene glycol has a molecular weight comprised from 100 to 1000 and the soybean oil fatty acid is alpha-linolenic acid (C-18:3)—CAS number 463-40-1, or linoleic acid (C-18:2)—CAS number 60-33-3, or oleic acid (C-18:1)—CAS number 112-80-1, or stearic acid—CAS number 57-11-4, or palmitic acid—CAS number 57-10-3 or mixtures thereof; in particular the soybean oil fatty acid selected can be a mixture of alpha-linolenic acid and/or linoleic acid and/or oleic acid in a ratio by weight of 1:1:1 or 1:1:2 or 1:2:1 or 1:2:2.

The vegetable olein or vegetable oleins are selected from the group comprising or, alternatively, consisting of oleic acid, linoleic acid, linolenic acid, a triglyceride of oleic acid $[(C_{17}H_{33}COO)_3C_3H_5]$ (also known as triolein) and a vegetable oil or mixtures thereof.

The vegetable oil can be selected from the group comprising or, alternatively, consisting of olive oil, linseed oil, rapeseed oil, peanut oil, corn oil, palm oil, sunflower oil and soybean oil. Preferably it is olive oil. Advantageously, it is palm oil.

In a preferred embodiment, said at least one vegetable olein or vegetable oleins comprise (amount by weight relative to the total weight of the vegetable olein) oleic acid (C18:1) in an amount comprised from 70 to 99% by weight and linoleic acid (C18:2) in an amount of less than 25% by weight.

In another preferred embodiment, said at least one vegetable olein or vegetable oleins comprise (amount by weight relative to the total weight of the vegetable olein) oleic acid (C18:1) in an amount comprised from 75 to 90% by weight, preferably from 80 to 85% by weight and linoleic acid (C18:2) in an amount of less than 20% by weight, preferably from 10 to 15% by weight.

In a further preferred embodiment, said at least one vegetable olein or vegetable oleins, as described above, can further comprise some saturated fatty acids with a number of carbon atoms equal to or less than 18 in an amount of less than 15% by weight, preferably in an amount comprised from 5 to 10% by weight.

In a preferred embodiment, said at least one vegetable olein or vegetable oleins comprise or, alternatively, consist of a vegetable oil. The vegetable oil can be selected from the group comprising or, alternatively, consisting of olive oil, linseed oil, rapeseed oil, peanut oil, corn oil, palm oil, sunflower oil and soybean oil. Preferably, it is olive oil. Advantageously, it is palm oil.

In another preferred embodiment, said at least one vegetable olein or vegetable oleins comprise or, alternatively, consist of a vegetable oil and oleic acid in a ratio by weight comprised from 1:3 to 3:1, preferably from 1:2 to 2:1, even more preferably in a 1:1 ratio by weight. Preferably, the oleic acid is selected from among products having an oleic acid concentration in greater than 70% by weight, preferably greater than 90% by weight.

In one embodiment, a palm olein has a composition of the type: C12:0=2-3%, C14:0=0.5-1%, C16:0=4-5%, C18:0=2-3%, C18:1=70-80%, C18:2=10-15%, other substances approximately 1%.

In one embodiment, a sunflower olein has a composition of the type: C16:0=5-15%, C18:0=2-8%, C18:1=20-35%, C18:2=45-70%, C18:3=0-7%.

In one embodiment, another vegetable olein can have the following composition: acids with a number of carbon atoms equal to or less than 014=2-3%, C16:0=4-5%, C18:0=1-2%, C18:1=75-80%, C18:2=10-11%.

In one embodiment, another vegetable olein can have the following composition: C18:0=less than 15%, C18:1=greater than 75%, C18:2=less than 15%, other substances less than 1%.

In the context of the present invention and hereinafter we shall make reference in general to "olein or oleins" to indicate one or more of the above-mentioned embodiments without any limitation, but solely for the purpose of simplifying the present description.

Advantageously (in the context of the present invention), the use refers to an association (mixture) comprising or, alternatively, consisting of an ethoxylated castor oil and at least one of said oleins.

Advantageously (in the context of the present invention), the use refers to an association (mixture) comprising or, alternatively, consisting of polyethylene glycol esters of fatty acids obtained from soybean oil and at least one of said oleins.

Advantageously (in the context of the present invention), the use refers to an association (mixture) comprising or, alternatively, consisting of (i) an ethoxylated castor oil, (ii) polyethylene glycol esters of fatty acids obtained from soybean oil and (iii) at least one of said oleins.

The determination of the fatty acid composition by gas chromatography can be carried out using the method NGD C 42-76, whereas the determination of the triglycerides in the vegetable oils by high-resolution chromatography (HPLC) can be carried out using the method NGD C 45-91:22024 (1992).

The Applicant has found that using an ethoxylated castor oil, as a technological additive, as described above, and/or polyethylene glycol esters of fatty acids obtained from soybean oil, as described above, in association with said at least one vegetable olein or vegetable oleins selected from the group comprising or, alternatively, consisting of oleic acid, linoleic acid, linolenic acid, a triglyceride of oleic acid and a vegetable oil or mixtures thereof as a technological additive in a process for preparing an animal feed containing nutritive substances in liquid, powder or granular form makes it possible to obtain the following advantages:

(i) to increase the output in tons per hour in plants that produce feeds in solid Form, for example in the form of cubes or pellets, (ii) to improve the pellet durability index (PDI), (iii) to reduce the consumption of electricity expressed in amperes per hour, (iv) to reduce the amount of dust that is produced and found in the animal feed in solid form, for example in the form of cubes or pellets, (v) to assure less wear on equipment and the possibility of better controlling the production T° C.

The present invention also relates to an animal feed, preferably a dry feed in the form of pellets.

In one embodiment, said feed contains nutritive substances in liquid, powder or granular form and further contains an ethoxylated castor oil as described above in association with the vegetable oleins as described above.

In another embodiment, said feed contains the nutritive substances in liquid, powder or granular form and the polyethylene glycol esters of fatty acids obtained from soybean oil in association with the vegetable oleins as described above.

In the context of the present invention, animal feed means, by way of non-restrictive example, a feed for pigs, fish, poultry species, e.g. chickens and turkeys, ruminants, e.g. cattle and calves, at any stage of growth.

The present invention also relates to a process for preparing said feed.

In the production of the feed, said ethoxylated castor oil, as described above, and said at least one vegetable olein, as described above, can be suitably mixed together to form a single product or, alternatively, they can be used in a separate manner.

In a preferred embodiment, the vegetable olein selected can be an oleic acid, said oleic acid preferably being present at a concentration greater than 70% by weight; or a mixture of oleic acid and linoleic acid, said mixture preferably comprising said oleic acid at a concentration equal to or greater than 75% by weight and said linoleic acid at a concentration equal to or less than 25% by weight; or a vegetable oil, said vegetable oil preferably being selected from the group comprising or, alternatively, consisting of olive oil, linseed oil, rapeseed oil, peanut oil, corn oil, palm oil, sunflower oil and soybean oil or mixtures thereof. Preferably, it is olive and/or palm oil. Advantageously, it is palm oil.

If the ethoxylated castor oil and/or the vegetable oleins are in a solid state at room temperature due to their high molecular weight, a preliminary heating step is envisaged in order to turn the two compounds into a liquid state.

The ethoxylated castor oil and/or vegetable oleins (mixed together or, alternatively, kept separate) can be directly added to the nutritive substances in liquid, powder or granular form or other solid components of the animal feed or with a mixture of two or more of these components.

Alternatively, the ethoxylated castor oil and/or the vegetable oleins (mixed together or, alternatively, kept separate) can optionally be dissolved or suspended in water and/or applied on a substrate or carrier or added to a liquid and/or solid vehicle, before being added to the nutritive substances in liquid, powder or granular form, or with a mixture of two or more of these components.

In a preferred embodiment, the animal feed can contain a hydrophobic component that is liquid or solid at room temperature, such as, for example, an animal and/or vegetable lipid, an oil, preferably a vegetable oil, a liquid and/or solid fat, preferably an animal fat.

In a first case, said hydrophobic component first has the ethoxylated castor oil and/or the vegetable oleins (first mixed together or, alternatively, kept separate) added to it and then the nutritive substances in liquid, powder or granular form or other solid components of the animal feed or a mixture of two or more of these components.

In a second case, said hydrophobic component first has the nutritive substances in liquid, powder or granular form or other solid components of the animal feed or with a mixture of two or more of these components added to it and then the ethoxylated castor oil and/or the oleins (first mixed together or, alternatively, kept separate).

In another embodiment, the ethoxylated castor oil and/or the vegetable oleins (first mixed together or, alternatively, kept separate) can be directly added to a hydrophobic component that is liquid or solid at room temperature, such as, for example, an animal and/or vegetable lipid, an oil, preferably a vegetable oil, a liquid and/or solid fat, preferably an animal fat.

In another preferred embodiment, said hydrophobic component in a liquid state (or, if solid, after a step of heating to render it liquid) can be added, for example, to said components in liquid or solid or granular or powder form, or part of them, in order to produce a solid powdery or granular mixture before adding the ethoxylated castor oil and/or vegetable oleins.

In the production of the feed of the present invention, said polyethylene glycol esters of fatty acids obtained from soybean oil, as described above, and said at least one vegetable olein (or vegetable oleins in general), as described above, can be suitably mixed together to form a single product or, alternatively, they can be used in a separate manner.

If said polyethylene glycol esters of fatty acids obtained from soybean oil and/or said vegetable oleins are in a solid state at room temperature due to their high molecular weight, a preliminary heating step is envisaged in order to turn the two compounds into a liquid state.

Said polyethylene glycol esters of fatty acids obtained from soybean oil and/or vegetable oleins (mixed together or, alternatively, kept separate) can be directly added to the nutritive substances in liquid, powder or granular form or other solid components of the animal feed or with a mixture of two or more of these components.

Alternatively, said polyethylene glycol esters of fatty acids obtained from soybean oil and/or vegetable oleins (mixed together or, alternatively, kept separate) can optionally be dissolved or suspended in water and/or applied on a substrate or carrier or added to a liquid and/or solid vehicle, before being added to the nutritive substances in liquid, substances in liquid, powder or granular form, or other solid components of the animal feed or with a mixture of two or more of these components.

In a preferred embodiment, the animal feed can contain a hydrophobic component that is liquid or solid at room temperature, such as, for example, an animal and/or vegetable lipid, an oil, preferably a vegetable oil, a liquid and/or solid fat, preferably an animal fat.

In a first case, said hydrophobic component first has said polyethylene glycol esters of fatty acids obtained from soybean oil and/or vegetable oleins (first mixed together or, alternatively, kept separate) added to it and then the nutritive substances in liquid, powder or granular form or other solid components of the animal feed or a mixture of two or more of these components.

In a second case, said hydrophobic component first has the nutritive substances in liquid, powder or granular form or other solid components of the animal feed or a mixture of two or more of these components added to it and then said polyethylene glycol esters of fatty acids obtained from soybean oil and/or vegetable oleins (first mixed together or, alternatively, kept separate).

In another embodiment said polyethylene glycol esters of fatty acids obtained from soybean oil and/or oleins (first mixed together or, alternatively, kept separate) can be directly added to a hydrophobic component that is liquid or solid at room temperature, such as, for example, an animal and/or vegetable lipid, an oil, preferably a vegetable oil, a liquid and/or solid fat, preferably an animal fat.

In another preferred embodiment, said hydrophobic component in a liquid state (or, if solid, after a step of heating to render it liquid) can be added, for example, to said components in liquid or solid or granular or powder form, or part of them, in order to produce a solid powdery or granular mixture before adding said polyethylene glycol esters of fatty acids obtained from soybean oil and/or vegetable oleins.

For example, if ethoxylated castor oil and said at least one olein are used (but the same thing also applies if said polyethylene glycol esters of fatty acids obtained from soybean oil and said at least one olein are used), the industrial preparation of an animal feed entails preparing a premixture containing, for example, mineral salts, vitamins, flavourings and other substances commonly used by the person skilled in the art. Depending on the type of feed, other components can also be added to the premixture, namely, cereals, barley, corn, oats and rice, vegetable proteins, for example proteins obtained from soybeans or sunflowers, or other proteins commonly used by the person skilled in the art.

The premixture subsequently has the ethoxylated castor oil and/or vegetable oleins. (first mixed together or, alternatively, kept separate) added to it. For example, the ethoxylated castor oil and/or olein can be optionally dissolved or suspended in water and/or applied on a substrate or carrier or added to a liquid and/or solid vehicle, such as, for example cereals, starch or minerals.

Subsequently, the hydrophobic component in a liquid state can be added to said premixture. If said hydrophobic component is in a solid state at room temperature, a heating step is envisaged.

The hydrophobic component which is liquid or solid at room temperature can be, for example, an animal and/or vegetable lipid, an oil, preferably a vegetable oil, a liquid and/or solid fat, preferably an animal fat. After complete mixing, a composition is obtained whose consistency will depend on the physical state and amounts used of the individual components.

In a preferred embodiment, the animal feed of the present invention can comprise said ethoxylated castor oil and said at least one olein in a ratio by weight comprised from 1:4 to 4:1, preferably from 1:2 to 2:1, even more preferably 1:1.

In a preferred embodiment, the animal feed of the present invention can comprise said polyethylene glycol esters of fatty acids obtained from soybean oil and said at least one olein in a ratio by weight comprised from 1:4 to 4:1, preferably from 1:2 to 2:1, even more preferably 1:1.

The animal feed of the present invention can comprise said ethoxylated castor oil in an amount comprised from 0.1 Kg to 1 Kg/ton of feed, preferably from 0.4 to 0.8 Kg/ton of feed. Advantageously, 0.5 Kg/ton of feed (0.05%).

The animal feed of the present invention can comprise said polyethylene glycol esters of fatty acids obtained from soybean oil in an amount comprised from 0.1 Kg to 1 Kg/ton of feed, preferably from 0.4 to 0.8 Kg/ton of feed.

Advantageously, 0.5 Kg/ton of feed.

The animal feed of the present invention can comprise said at least one olein in an amount comprised from 3 Kg to 10 Kg/ton of feed, preferably from 5 Kg to 8 Kg/ton of feed.

The animal feed of the present invention can comprise a hydrophobic component as described above in an amount comprised from 1 to 12 Kg/100 Kg of feed, preferably 10 Kg/100 Kg of feed.

The animal feed of the present invention can comprise water in an amount comprised from 0.5 Kg to 1 Kg/100 Kg of feed.

The animal feed of the present invention can be subjected to a pelletting or extrusion step to yield a feed with variable dimensions typical of animal feeds in pellets.

In the context of the present invention, the use of only ethoxylated castor oil is not envisaged, since ethoxylated castor oil is not capable on its own of improving the production parameters taken into consideration in the present invention (see experimental part, tests 1-4).

Furthermore, in the context of the present invention, the use of only oleins, as defined above, is not envisaged, since said oleins are not capable on their own of improving the production parameters taken into consideration in the present invention (see experimental part, tests 1-4).

The present invention relates to the use of a mixture comprising or, alternatively, consisting of:
(i) an ethoxylated castor oil containing from 8 to 200 ethyleneoxy groups, and/or
(ii) polyethylene glycol esters of fatty acids obtained from soybean oil, in association with at least one vegetable olein selected from the group comprising or, alternatively, consisting of an oleic acid, linoleic acid, linolenic acid, a triglyceride of oleic acid and a vegetable oil or mixtures thereof in a process for preparing an animal feed containing nutritive substances in liquid, powder or granular form.

Preferably, said mixture comprises or, alternatively, consists of:
(i) an ethoxylated castor oil E484, and/or
(ii) polyethylene glycol esters of fatty acids obtained from soybean oil E487, in association with said at least one vegetable olein.

Preferably, said ethoxylated castor oil contains from 10 to 150 ethyleneoxy groups; preferably, it contains from 20 to 80 ethyleneoxy groups.

Preferably, said vegetable olein is selected from among:
an oleic acid; preferably, preferably said oleic acid has a concentration greater than 70% by weight;
a mixture of oleic acid and linoleic acid, preferably said mixture comprises said oleic acid at a concentration equal to or greater than 75% by weight and said linoleic acid at a concentration equal to or less than 25% by weight; and
a vegetable oil selected from the group comprising or, alternatively, consisting of olive oil, linseed oil, rapeseed oil, peanut oil, corn oil, palm oil, sunflower oil and soybean oil or mixtures thereof; preferably, it is olive and/or palm oil.

Preferably, said ethoxylated castor oil and said vegetable olein are used in a ratio by weight comprised from 1:4 to 4:1, preferably from 1:2 to 2:1, even more preferably 1:1.

Preferably, said ethoxylated castor oil is used in an amount comprised from 0.4 to 0.8 Kg/ton of feed, preferably in an amount of 0.5 Kg/ton of feed; and
said vegetable olein is used in an amount comprised from 3 Kg to 10 Kg/ton of feed, preferably 5 Kg a 8 Kg/ton of feed.

The present invention relates to an animal feed containing nutritive substances in liquid, powder or granular form, characterized in that it comprises an ethoxylated castor oil containing from 8 to 200 ethyleneoxy groups and/or polyethylene glycol esters of fatty acids obtained from soybean oil, in association with at least one vegetable olein selected from the group comprising or, alternatively, consisting of oleic acid, linoleic acid, linolenic acid, a triglyceride of oleic acid and a vegetable oil or mixtures thereof.

Preferably, in said feed said ethoxylated castor oil and/or said polyethylene glycol esters of fatty acids obtained from soybean oil and said vegetable olein are selected in accordance with one of the above-described embodiments.

The present invention relates to a process for preparing a feed, as described above, said process being characterized in that it comprises a step in which a mixture comprising or, alternatively, consisting of:
(i) an ethoxylated castor oil containing from 8 to 200 ethyleneoxy groups, and/or
(ii) polyethylene glycol esters of fatty acids obtained from soybean oil, in association with at least one vegetable olein selected from the group comprising or, alternatively, consisting of an oleic acid, linoleic acid, linolenic acid, a triglyceride of oleic acid and a vegetable oil or mixtures thereof are added directly, or after being first dissolved in water or suspended in water or added to a carrier, into the nutritive substances in liquid, powder or granular form or optionally into other solid components of the animal feed.

Preferably, in said process said ethoxylated castor oil and/or said polyethylene glycol esters of fatty acids obtained from soybean oil and said vegetable olein are selected in accordance with at least one of the above-described embodiments and can be added, separately from each other or after first being mixed, to the nutritive substances in liquid, powder or granular form.

Preferably, in said process said ethoxylated castor oil (i) and said at least one vegetable olein (iii) can be added, after first being mixed to yield a mixture, to the nutritive substances in liquid, powder or granular form or optionally into other solid components of the animal feed.

Preferably, in said process said ethoxylated castor oil containing from 8 to 200 ethyleneoxy groups and/or said polyethylene glycol esters of fatty acids obtained from soybean oil and said at least one vegetable olein can be added, separately from each other or after first being mixed, to a hydrophobic component that is liquid or solid at room temperature, selected from the group comprising an animal and/or vegetable lipid, an oil, preferably a vegetable oil, a liquid and/or solid fat, preferably an animal fat.

The present invention will now be described with the aid of several examples, which are given solely for illustrative purposes and therefore do not limit the scope of the present invention.

EXAMPLES

In a plant for preparing a chicken feed, the following feed was prepared. In a container provided with mixing means, heating means, water filling means and means for maintaining humidity, 50 Kg of corn, 18 Kg of soy, 12 Kg of sunflower and 10 Kg of barley, 4 Kg of sugar cane molasses and 6 Kg of a mixture of calcium carbonate, sodium chloride, vitamins and minerals were added in sequence to yield a powder mixture. Afterwards, 10 Kg of a hydrophobic component consisting in an animal fat was added. Said mixture was maintained under stirring at room temperature. Subsequently, the liquid components, if present, and 0.5 Kg of water/100 Kg of feed were added and after stirring said ethoxylated castor oil and said at least one olein or said polyethylene glycol esters of fatty acids obtained from soybean oil and said at least one olein were then added, in accordance with one of the formulations F1-F20, as set forth below. At the end of mixing, a powder or granular mixture was obtained and then subjected to a pelletting step to yield a pellet of dimensions known to the person skilled in the art.

List of the Formulations Tested (F):
Ethoxylated Castor Oil (F1-F4)
  F1: Ethoxylated castor oil E484 with 10 moles of ethylene oxide.
  F2: Ethoxylated castor oil E484 with 20 moles of ethylene oxide.
  F3: Ethoxylated castor oil E484 with 40 moles of ethylene oxide.
  F4: Ethoxylated castor oil E484 with 50 moles of ethylene oxide.
Vegetable Oleins (F5-F6)
  F5: Oleic acid.
  F6: Oleic acid 80%+Linoleic acid 20%.
Polyethylene Glycol Esters of Fatty Acids Obtained from Soybean Oil E487 (F7-F8)
  F7: Polyethylene glycol esters of fatty acids obtained from soybean oil E487, in a 1:1 ratio by weight. The polyethylene glycol has a molecular weight of approximately 300 and the soybean fatty acids are: palmitic acid, approximately 10%; stearic acid, approximately 5%; oleic acid, approximately 20%; linoleic acid, approximately 55% and alpha-linolenic acid, approximately 10%.
  F8: Polyethylene glycol esters of fatty acids obtained from soybean oil E487, in a 1:1 ratio by weight. The polyethylene glycol has a molecular weight of approximately 800 and the soybean fatty acids are: palmitic acid, approximately 10%; stearic acid, approximately 5%; oleic acid, approximately 20%; linoleic acid, approximately 55% and alpha-linolenic acid, approximately 10%.

The Applicant tested the formulations specified in Table 1 in the preparation of an animal feed in pellets for chickens, turkeys, ruminants (dairy cows) and pigs.

TABLE 1

| FORMULATIONS | Chickens | Turkeys | Pigs | Dairy cows |
|---|---|---|---|---|
| F2 | 100% | 100% | 100% | 100% |
| F2 + F5 | 50%-50% | 50%-50% | 50%-50% | 50%-50% |
| F2 + F6 | 50%-50% | 50%-50% | 50%-50% | 50%-50% |
| F4 | 100% | 100% | 100% | 100% |
| F4 + F5 | 50%-50% | 50%-50% | 50%-50% | 50%-50% |
| F4 + F6 | 50%-50% | 50%-50% | 50%-50% | 50%-50% |
| F2 + F7 | 50%-50% | 50%-50% | 50%-50% | 50%-50% |
| F2 + F8 | 50%-50% | 50%-50% | 50%-50% | 50%-50% |
| F4 + F7 | 50%-50% | 50%-50% | 50%-50% | 50%-50% |
| F4 + F8 | 50%-50% | 50%-50% | 50%-50% | 50%-50% |

An example (A) of a feed for dairy cows is shown here:

| INGREDIENTS | KG | % |
|---|---|---|
| CORN MEAL | 50.00 | 50.00% |
| SOYBEAN | 15.00 | 15.00% |
| SUNFLOWER | 15.00 | 15.00% |
| BARLEY | 10.00 | 10.00% |
| SUGAR CANE MOLASSES | 4.00 | 4.00% |
| CALCIUM CARBONATE | 2.00 | 2.90% |
| SODIUM BICARBONATE | 1.50 | 1.50% |
| SODIUM CHLORIDE | 0.75 | 0.75% |
| DICALCIUM PHOSPHATE | 0.75 | 0.75% |
| VITAMINS | 0.50 | 0.50% |
| MAGNESIUM OXIDE | 0.50 | 0.50% |
| Totals | 100.00 | 100.00% |
|  | 88.00 SS | (Humidity 12.00%) |

An example (B) of a feed for pigs is shown here:

| INGREDIENTS | KG | % |
|---|---|---|
| SOFT WHEAT | 30.00 | 30.00% |
| COOKED WHEAT | 20.00 | 20.00% |
| FLAKED BARLEY | 16.00 | 16.00% |
| WHEY | 9.00 | 9.00% |
| FLAKED CORN | 9.00 | 9.00% |
| HERRINGS | 7.00 | 7.00% |
| SOYBEAN OIL | 3.90 | 3.90% |
| POTATO | 2.50 | 2.50% |
| DICALCIUM PHOSPHATE | 0.50 | 0.50% |
| ACIDIFIER | 0.50 | 0.50% |
| CALCIUM CARBONATE | 0.50 | 0.50% |
| L-LYSINE HCL | 0.50 | 0.50% |
| L-THREONINE | 0.30 | 0.30% |
| SODIUM CHLORIDE | 0.20 | 0.20% |
| DL-METHIONINE | 0.06 | 0.06% |
| L-TRYPTOPHAN | 0.04 | 0.04% |
| Totals | 100.00 | 100.00% |
|  | 89.50 DM | (Humidity 10.5%) |

An example (C) of a feed for chickens (first period) is shown here:

| INGREDIENTS | Kg | % |
|---|---|---|
| CORN | 60.00 | 60.00 |
| SOYBEAN | 35.000 | 35.00 |
| DICALCIUM PHOSPHATE | 2.00 | 2.00 |
| SOYBEAN OIL | 1.20 | 1.20 |
| CALCIUM CARBONATE | 0.80 | 0.80 |
| TRACE ELEMENTS | 0.30 | 0.30 |
| VITAMINS | 0.30 | 0.30 |
| SODIUM BICARBONATE | 0.20 | 0.20 |
| SODIUM CHLORIDE | 0.20 | 0.20 |
| Totals | 100.00 Kg DM | 87.30% |

An example (D) of a feed for chickens (third period) is shown here:

| INGREDIENTS | Kg | % |
|---|---|---|
| CORN | 66.00 | 66.00 |
| SOYBEAN | 25.00 | 25.00 |
| SOYBEAN OIL | 3.50 | 3.50 |
| DICALCIUM PHOSPHATE | 2.50 | 2.50 |
| CALCIUM CARBONATE | 1.20 | 1.20 |
| TRACE ELEMENTS | 0.80 | 0.80 |
| VITAMINS | 0.50 | 0.50 |
| SODIUM BICARBONATE | 0.20 | 0.20 |
| SODIUM CHLORIDE | 0.30 | 0.30 |
| Totals | 100.00 Kg DM | 87.50 |

An example (E) of a feed for turkeys (first period) is shown here:

| INGREDIENTS | Kg | % |
|---|---|---|
| SOYBEAN | 50.00 | 50.00 |
| CORN | 43.00 | 43.00 |
| DICALCIUM PHOSPHATE | 2.50 | 2.50 |
| CALCIUM CARBONATE | 1.50 | 1.50 |
| SOYBEAN OIL | 1.50 | 1.50 |
| TRACE ELEMENTS | 0.50 | 0.50 |
| VITAMINS | 0.50 | 0.50 |
| SODIUM CHLORIDE | 0.50 | 0.50 |
| Totals | 100.00 Kg DM | 87.50 |

During the production of the various animal feeds, the following parameters were monitored:

i) the temperature (T ° C.) of the pellet leaving the extruder.

ii) the consumption of energy (Amperes) per tons/hour of feed produced.

iii) the hourly output expressed in tons/hour.

iv) the final humidity value (% humidity) found in the pellet.

v) the pellet durability index (P.D.I.), which expresses the hardness/consistency of the pellet. The P.D.I. depends on the type of feed that is prepared. The person skilled in the art is aware of the minimum and maximum PDI which characterizes a feed in pellets for chickens, turkeys, pigs and calves.

Tests 1-4 illustrated in Table 2 show only part of the experimentation conducted by the Applicant.

In particular, tests 1 and 3 and tests 2 and 4 were conducted separately under the same operating conditions in a plant for preparing a chicken feed having the ingredients specified above.

Practically speaking, in an industrial plant for the production of a chicken feed (C) and (D), as described above, the parameters specified above in items (i)-(v) were recorded.

The parameters in the "chicken feed" column shown for each of tests 1-4 (see second column from the left) were recorded without the use of any of the formulations of the present invention.

The parameters in the "formulation F2" column shown for each of tests 1 and 3 (see third column from the left) were recorded with the use of the formulation F2 of the present invention. The formulation F2 was used at a concentration of 0.5 Kg/ton of feed.

The parameters in the "formulation F2+F5" column shown for test 1 (see fourth column from the left) were recorded with the use of the formulation F2+F5 of the present invention. The formulation F2+F5 (1:1 ratio by weight) was used at a concentration of 0.5 Kg/ton of feed. The same applies for the "formulation F2+F7" in test 3.

The parameters in the "formulation F2+F6" column shown for test 1 (see fifth column from the left) were recorded with the use of the formulation F2+F6 of the present invention. The formulation F2+F6 (1:1 ratio by weight) was used at a concentration of 0.5 Kg/ton of feed. The same applies for the "formulation F2±F8" in test 3.

The parameters in the "oleins F5" and "oleins F6" column shown for each of tests 1-4 (see sixth and seventh columns from the left) were recorded with the use of the formulations F5 and F6. The oleins F5 and F6 were used at a concentration of 5 Kg/ton of feed.

The parameters in the "formulation F4" column shown for each of tests 2 and 4 (see third column from the left) were recorded with the use of the formulation F4 of the present invention. The formulation F4 was used at a concentration of 0.5 Kg/ton of feed.

The parameters in the "formulation F4+F5" shown for test 2 (see fourth column from the left) were recorded with the use of the formulation F4+F5 of the present invention. The formulation F4+F5 (1:1 ratio by weight) was used at a concentration of 0.5 Kg/ton of feed. The same applies for the "formulation F4+F7" in test 4.

The parameters in the "formulation F4+F6" column shown for test 2 (see fifth column from the left) were recorded with the use of the formulation F4+F6 of the present invention. The formulation F4+F6 (1:1 ratio by weight) was used at a concentration of 0.5 Kg/ton of feed. The same applies for the "formulation F4+F8" in test 4.

For example, considering test 1 carried out without the use of a formulation of the present invention (second column from the left) the hourly output in tons/hour (briefly, tons/hour) is approximately 22-23 tons/hour, whereas the PDI is approximately 90-91. With the use of a formulation F2 containing only ethoxylated castor oil, the hourly output rises to 23-24 tons/hour and the PDI to 91-92. Surprisingly, the formulation of the present invention F2+F5 brings the hourly output to 26-27 and the PDI to 93-94. Whereas the formulation F2+F6 provides an hourly output of 27-28 and a PDI of 93-94. The increase in the hourly output and PDI are considerable if compared with the values shown in the second and third columns from the left.

The same applies for tests 2, 3 and 4. Therefore, all of the tests 1-4 carried out by the Applicant are in agreement in demonstrating that the formulations of the present invention are capable of:

(i) increasing the output in tons per hour in plants that produce feeds in solid form, for example in the form of pellets, (ii) improving the pellet durability index (PDI), (iii) reducing the consumption of electricity expressed in amperes/hour, (iv) reducing the amount of dust that is produced and remains in the animal feed in solid form, for example in the form of pellets.

(v) assuring less wear on equipment and the possibility of better controlling the production T ° C.

The Applicant further verified the use of a formulation consisting only of oleins, for example the formulations F5 and F6 (without the presence of the ethoxylated castor oil or polyethylene glycol esters of fatty acids derived from soybean).

In a first trial, the Applicant prepared a chicken feed using oleic acid in an amount of 0.05% (0.5 Kg/ton of feed), 0.10 and 0.15% by weight and, separately, a mixture of 80% oleic acid and 20% linoleic acid in an amount of 0.05 (0.5 Kg/ton of feed), 0.10 and 0.15% by weight, relative to the total weight of the mixture (4:1 ratio by weight). The results obtained, compared with those obtained in tests 1-4, did not show any effect on the parameters T° C., Amperes, tons/hour, % humidity or P.D.I. due to the presence of oleins and for this reason they have not been shown in Table 2 with tests 1-4.

However, the Applicant conducted a second trial using oleic acid in an amount of 0.5% by weight of (5 Kg/ton of feed) and a mixture of 80% oleic acid and 20% linoleic acid in an amount of 0.5% by weight, relative to the total weight of the mixture (5 Kg/ton of feed). The data regarding the parameters measured are shown in Table 2 (sixth and seventh column from the left). The results obtained show that the values of the parameters are comparable only to those obtained without the use of any formulation of the present invention (see second and third column from the left), notwithstanding that the concentration of oleins used was 10 times greater than concentrations of the tested formulations of the present invention.

Finally, the Applicant tested a mixture of organic acids comprising formic acid, calcium formate, sorbic acid and potassium sorbate (in a 1:1:1:1 ratio by weight and at a concentration of 0.5 Kg/ton and 5 Kg/ton of feed) in order to assess the effect of said mixture of organic acids and salts thereof, used at a concentration of 0.05 and 0.5% by weight, on hourly output, energy consumption and the parameter PDI during the preparation of an animal feed, preferably in pellets. Practically speaking, under the same operating conditions, the Applicant compared the parameters T° C., Amperes, tons/hour, % humidity and P.D.I. (see tests 1-4) obtained during the preparation of a chicken feed when a mixture of organic acids (and salts thereof) in an amount of 0.05% and 0.5% by weight is used in place of one of the formulations of the present invention. The results obtained with the mixture of organic acids, at the two concentrations used, were not satisfactory and not even comparable to those obtained thanks to the use of a formulation in accordance with the present invention.

TABLE 2

| Test 1 | | | | | | |
|---|---|---|---|---|---|---|
| PARAMETERS | CHICKEN FEED | FORMULATION F2 | FORMULATION F2 + F5 | FORMULATION F2 + F6 | OLEINS F5 | OLEINS F6 |
| T ° C. | 80 ± 1 | 81 ± 1 | 83 ± 1 | 83 ± 1 | 78 ± 1 | 78 ± 2 |
| AMPERES | 470 | 470 | 465 | 470 | 490 | 490 |
| TONS/HOUR | 22-23 | 23-24 | 26-27 | 27-28 | 22-23 | 22-23 |
| % FINAL HUMIDITY | 11.40% | 11.60% | 11.90% | 11.90% | 11.30% | 11.50% |
| P.D.I. | 90-91 | 91-92 | 93-94 | 93-94 | 91-92 | 90-91 |
| % FORMULATION | / | 0.05 | 0.05 | 0.05 | / | / |
| % WATER | 0.5 | 0.5 | 0.5 | 0.5 | 0.5 | 0.5 |
| % OLEIN | / | / | / | / | 0.5 | 0.5 |

| Test 2 | | | | | | |
|---|---|---|---|---|---|---|
| PARAMETERS | CHICKEN FEED | FORMULATION F4 | FORMULATION F4 + F5 | FORMULATION F4 + F6 | OLEINS F5 | OLEINS F6 |
| T ° C. | 82 ± 1 | 82 ± 1 | 83 ± 1 | 83 ± 1 | 80 ± 1 | 81 ± 1 |
| AMPERES | 480 | 480 | 475 | 470 | 500 | 510 |
| TONS/HOUR | 21-22 | 22-23 | 27-28 | 26-27 | 21-22 | 21-22 |
| % FINAL HUMIDITY | 11.50% | 11.60% | 12.00% | 12.10% | 11.60% | 11.50% |
| P.D.I. | 90-91 | 91-92 | 93-94 | 93-94 | 91-92 | 91-92 |
| % FORMULATION | / | 0.05 | 0.05 | 0.05 | / | / |
| % WATER | 0.5 | 0.5 | 0.5 | 0.5 | 0.5 | 0.5 |
| % OLEIN | / | / | / | / | 0.5 | 0.5 |

| Test 3 | | | | | | |
|---|---|---|---|---|---|---|
| PARAMETERS | CHICKEN FEED | FORMULATION F2 | FORMULATION F2 + F7 | FORMULATION F2 + F8 | OLEINS F5 | OLEINS F6 |
| T ° C. | 80 ± 1 | 81 ± 1 | 82 ± 1 | 83 ± 1 | 78 ± 1 | 78 ± 1 |
| AMPERES | 470 | 470 | 470 | 470 | 490 | 490 |
| TONS/HOUR | 22-23 | 23-24 | 25-26 | 27-28 | 22-23 | 22-23 |
| % FINAL HUMIDITY | 11.40% | 11.60% | 12.00% | 11.90% | 11.30% | 11.50% |
| P.D.I. | 90-91 | 91-92 | 94-95 | 93-94 | 91-92 | 90-91 |
| % FORMULATION | / | 0.05 | 0.05 | 0.05 | / | / |
| % WATER | 0.5 | 0.5 | 0.5 | 0.5 | 0.5 | 0.5 |
| % OLEIN | / | / | / | / | 0.5 | 0.5 |

| Test 4 | | | | | | |
|---|---|---|---|---|---|---|
| PARAMETRI | CHICKEN FEED | FORMULATION F4 | FORMULATION F4 + F7 | FORMULATION F4 + F8 | OLEINS F5 | OLEINS F6 |
| T ° C. | 82 ± 1 | 82 ± 1 | 83 ± 1 | 83 ± 1 | 80 ± 1 | 81 ± 1 |
| AMPERES | 480 | 480 | 480 | 480 | 500 | 510 |
| TONS/HOUR | 21-22 | 22-23 | 27-28 | 28-29 | 21-22 | 21-22 |
| % FINAL HUMIDITY | 11.50% | 11.60% | 11.90% | 12.00% | 11.60% | 11.50% |
| P.D.I. | 90-91 | 91-92 | 94-95 | 93-94 | 91-92 | 91-92 |
| % FORMULATION | / | 0.05 | 0.05 | 0.05 | / | / |

TABLE 2-continued

| % WATER | 0.5 | 0.5 | 0.5 | 0.5 | 0.5 | 0.5 |
|---|---|---|---|---|---|---|
| % OLEIN | / | / | / | / | 0.5 | 0.5 |

The invention claimed is:

1. A method for preparing an animal feed containing nutritive substances and an ethoxylated castor oil, the method comprising
adding the ethoxylated castor oil to the animal feed containing the nutritive substances by preparing a first mixture comprising:
an ethoxylated castor oil containing from 8 to 200 ethyleneoxy groups, and at least one vegetable compound selected from the group consisting of an oleic acid, linoleic acid, linolenic acid, a triglyceride of oleic acid and a vegetable oil or mixtures thereof; and
adding said prepared first mixture to the nutritive substances, wherein the nutritive substances are in liquid, powder or granular form, in an animal feed production plant, said prepared first mixture optionally in combination with a substrate, carrier and/or vehicle in a solid form, the adding performed to produce a second mixture in a solid form; and
extruding or pelleting the second mixture to obtain the animal feed containing said nutritive substances and the ethoxylated castor oil,
wherein the ethoxylated castor oil is added to the nutritive substances only when together with the at least one vegetable compound.

2. The method according to claim 1, wherein the ethoxylated castor oil is E484.

3. The method according to claim 1, wherein said ethoxylated castor oil contains from 10 to 150 ethyleneoxy groups.

4. The method according to claim 1, wherein said vegetable compound is selected from among:
an oleic acid; or
a mixture of oleic acid and linoleic acid; or
a vegetable oil selected from olive oil, linseed oil, rapeseed oil, peanut oil, corn oil, palm oil, sunflower oil and soybean oil or mixtures thereof.

5. The method according to claim 1, wherein said ethoxylated castor oil and said vegetable compound are used in a weight ratio of from 1:4 to 4:1.

6. The method according to claim 1, wherein:
said ethoxylated castor oil is used in an amount from 0.4 to 0.8 Kg/ton of feed; and
said vegetable compound is used in an amount from 3 Kg to 10 Kg/ton of feed.

7. The method according to claim 1, wherein said ethoxylated castor oil contains from 20 to 80 ethyleneoxy groups.

8. The method according to claim 1, wherein said ethoxylated castor oil and said vegetable compound are in a weight ratio of from 1:2 to 2:1.

9. The method according to claim 1, wherein said ethoxylated castor oil and said vegetable compound are in a ratio by weight of 1:1.

10. The method according to claim 1, wherein:
said ethoxylated castor oil is in an amount of 0.5 Kg/ton of feed; and
said vegetable compound is in an amount from 5 Kg to 8 Kg/ton of feed.

11. The method according to claim 2, wherein said ethoxylated castor oil E484 contains from 10 to 150 ethyleneoxy groups.

12. The method according to claim 1, wherein the second mixture comprises at least a second vegetable compound selected from the group consisting of an oleic acid, linoleic acid, linolenic acid, and a triglyceride of oleic acid.

13. A process for preparing an animal feed comprising nutritive substances and an ethoxylated castor oil, the process comprising
adding a first mixture directly into nutritive substances, wherein the nutritive substance are in liquid, powder or granular form in an animal feed production plant to produce a second mixture in a solid form, or optionally after the first mixture being first added into a substrate, carrier and/or vehicle in a solid form, and
extruding or pelleting the second mixture to obtain animal feed containing said nutritive substances,
the first mixture comprising:
an ethoxylated castor oil containing from 8 to 200 ethyleneoxy groups, and at least one vegetable compound selected from the group consisting of an oleic acid, linoleic acid, linolenic acid, a triglyceride of oleic acid and a vegetable oil or mixtures thereof, wherein the ethoxylated castor oil is added to the nutritive substances only when together with the at least one vegetable compound within the first mixture.

14. An animal feed prepared by the process of claim 13, the animal feed comprising:
nutritive substances in liquid, powder or granular form;
an ethoxylated castor oil containing from 8 to 200 ethyleneoxy groups; and
at least one vegetable compound selected from the group consisting of oleic acid, linoleic acid, linolenic acid, a triglyceride of oleic acid and a vegetable oil or mixtures thereof.

15. The feed according to claim 14, wherein said ethoxylated castor oil is in an amount from 0.4 to 0.8 Kg/ton of feed; and said vegetable compound is in an amount from 3 Kg to 10 Kg/ton of feed.

16. The process according to claim 13, wherein adding a first mixture to the nutritive substances is performed by
mixing said ethoxylated castor oil and said vegetable compound, and
adding the mixed said ethoxylated castor oil and said vegetable compound to the nutritive substances in liquid, powder or granular form.

17. The process according to claim 13, wherein adding a first mixture to the nutritive substances is performed by
mixing said ethoxylated castor oil, said vegetable compound with the substrate, carrier and/or vehicle in a solid form, and
adding the mixed said ethoxylated castor oil, said at least one vegetable compound and the substrate, carrier and/or vehicle in a solid form to the nutritive substances in liquid, powder or granular form.

18. The process according to claim 13, wherein adding a first mixture to the nutritive substances is performed by
mixing said ethoxylated castor oil, said vegetable compound with a hydrophobic component that is liquid or solid at room temperature, the hydrophobic component selected from the group comprising an animal and/or vegetable lipid, an oil, a liquid and/or solid fat, and adding the mixed said ethoxylated castor oil containing from 8 to 200 ethyleneoxy groups, said at least one vegetable compound and the hydrophobic component to the nutritive substances in liquid, powder or granular form.

19. The feed according to claim 15, wherein said vegetable compound is selected from among:
an oleic acid; or
a mixture of oleic acid and linoleic acid; or
a vegetable oil selected from olive oil, linseed oil, rapeseed oil, peanut oil, corn oil, palm oil, sunflower oil and soybean oil or mixtures thereof.

20. The feed according to claim 15, wherein said vegetable compound is selected from:
an oleic acid, in a concentration greater than 70% by weight of the vegetable compound; or
a mixture of oleic acid at a concentration equal to or greater than 75% by weight of the vegetable compound and linoleic acid at a concentration equal to or less than 25% by weight of the vegetable compound; or
a vegetable oil selected from olive oil and/or palm oil.

21. The feed according to claim 20, wherein said ethoxylated castor oil and said vegetable compound are used in a ratio by weight from 1:4 to 4:1.

22. The feed according to claim 14 is in the form of pellets.

* * * * *